Patented Feb. 5, 1946

2,394,030

UNITED STATES PATENT OFFICE 2,394,030

DIELECTRIC MATERIAL AND METHOD OF MAKING SAME

Eugene Wainer, Niagara Falls, N. Y., assignor to The Titanium Alloy Manufacturing Company, Niagara Falls, N. Y.

No Drawing. Application February 5, 1943, Serial No. 474,851

16 Claims. (Cl. 106—39)

This invention relates to dielectric compositions of matter and methods of producing the same.

In the preparation of insulating bodies for use as dielectrics in condensers, two properties are most important in measuring their usefulness. These properties are their dielectric constants and their power factors. For use at commercial broadcast frequencies below 2 megacycles, power factors of 0.1% or less are satisfactory. For this purpose commercial quality pure grade titanium dioxide may be employed, since when fired to a ceramic condition this material has a dielectric constant of between 100 and 110 and its power factor is from about 0.05% to 0.07%.

However, when the intended field of use of the condenser is in the micro-wave or ultra high frequency range, the power factor of the dielectric material of capacitors must be below 0.02% and a value below 0.01% is preferred. If titanium dioxide is purified to an extraordinary degree, power factors of 0.01% or less at very high frequencies may be attained, but this is no solution to the problem of producing a dielectric for high frequency use because of the impracticality of producing such material on a commercial scale. For instance, commercial grade titanium dioxide of high quality has a TiO₂ content of from 98 to 98.5%. The impurities making up the balance include silica, alumina, lime and phosphoric acid. About 0.02% of the material is accounted for by such metals as iron, copper, vanadium, chromium, nickel and manganese.

To produce a satisfactory ceramic body, titanium dioxide must be about 99.5% pure and the production of such material can only be accomplished in the laboratory, not on a commercial scale. Even if titanium dioxide of the indicated purity were available, the problem would not be answered, since extreme care and high temperature firing are required to produce a ceramic body of sufficiently low power factor. In commercial operation the casual introduction of enough impurities to defeat the desired end could not be avoided. The impurities which thus lower the purity of the starting material are chiefly compounds of iron, aluminum, silicon and sodium, because of the nature of the commercial equipment which must be employed in production on a tonnage scale.

The present invention affords a composition which avoids the objections noted in a practical and economical manner and, in fact, presents advantages that even pure titanium dioxide does not possess. According to the present invention, combinations of titanium dioxide and calcium oxide are fired to ceramic form with or without the addition of minor amounts of fluxing agents.

The finished body is formed by providing a material consisting of calcium titanate plus enough calcium oxide to ceramically combine with all of the impurities normally present in the starting materials. This material is then suitably shaped into whatever condenser dielectric form is desired and fired to a vitrified condition.

The dielectric constant of a body prepared in this manner is much higher than that of a body prepared from titanium dioxide, the dielectric constant of the latter being from 110 to 120, while the dielectric constant of the calcium titanate body prepared according to the present invention is 130. Further, and of greater importance, power factors of 0.01% and less are easily attained in the bodies of the present invention in production on a commercial scale without special precautions or unusual care.

A further and very important advantage of the dielectric bodies resulting from pursuance of the present invention is the fact that they exhibit power factors whose temperature coefficient is substantially zero. The temperature coefficients of the power factors of titanium dioxide dielectrics are positive, that is, their power factors increase with increases in temperature.

A further and important practical advantage attending the use of the calcium titanate ceramic materials of the present invention is the fact that a much greater firing range is afforded. Titanium dioxide has a useful firing range of only 40 or 50° Fahrenheit while the bodies of the present invention may be fired at temperatures extending through a range of nearly 200° Fahrenheit.

The starting materials required in pursuance of the present invention are commercially available raw materials and no unusually rigorously purified substances are necessary. It appears that the impurities of both of the starting materials which are chiefly responsible for the usual too high power factors are silica, alumina, phosphoric acid and such metals as iron, manganese, chromium and vanadium. In the presence of an excess of lime, calcium compounds of these impurities are apparently formed, but whatever the reason, unusual and unexpected dielectric results are attained when the teachings of the present invention are followed.

As one of the raw materials suitable for preparing dielectric bodies of this invention any lime compound may be used which, upon calcination, yields calcium oxide. Economic and manufacturing considerations render preferable calcium carbonate of the grade commercially known as "whiting and precipitate." This is a form of finely divided calcium carbonate which is very pure and available in large quantities. The impurities of this material are, in general, traces of iron, silica, magnesia and the like, but the total of impurities is usually less than 0.5%.

As the titanium oxide constituent it is preferred to use the type commercially known as pigment grade, which is relatively pure and very finely divided. Typical analyses of pigment grade titania are as follows:

Table No. 1

|  | A | B |
|---|---|---|
| $SiO_2$ | 0.70 | 0.10 |
| $Al_2O_3$ | 0.20 | 0.02 |
| $ZrO_2$ | 0.02 | 0.02 |
| $Sb_2O_3$ | 0.03 | 0.002 |
| $Fe_2O_3$ | 0.005 | 0.002 |
| $CaO$ | 0.15 | 0.15 |
| $MgO$ | 0.02 | 0.01 |
| $Na_2O$ | 0.03 | 0.02 |
| $B_2O_3$ | 0.001 | 0.001 |
| $P_2O_5$ | 0.20 | 0.35 |

In addition to the above, each of the analyses showed a total of 0.01% of the oxides of chromium, vanadium, manganese, copper, tin and nickel, the balance being $TiO_2$.

In preparing the dielectric bodies, enough CaO is used to combine with all of the titania and with the impurities present. To insure completeness of reaction it is preferred to provide a slight excess of calcium carbonate. The theoretical combining proportions of $TiO_2$ and $CaCO_3$ are 79.90 parts of the former to 100.06 parts of the latter; but to avoid forming titanates of the impurities, and to insure the presence of titanium in the finished body only as calcium titanate, it has been found, when dealing with the commercial raw materials referred to above that the minimum calcium carbonate content of the starting mixture is in the ratio of 102 parts thereof to 80 parts of pigment grade titanium dioxide. To more conveniently insure uniform results, a ratio of 104 to 80 is preferred and as much as 120 parts of $CaCO_3$ to 80 parts of $TiO_2$ can be used and a good ceramic body obtained. However, the use of such an excess of $CaCO_3$ presents no added advantage as far as the power factor of the resultant body is concerned.

In making the preferred composition, 104 parts of whiting precipitate is mixed with 80 parts of titanium oxide pigment and the batch is calcined for reaction. This usually requires 5 to 6 hours at 2250° to 2350° Fahrenheit. The cold reacted product is then milled wet in ball mills and the slip is dried. The dried product is comminuted and plates of suitable size and shape are pressed out. 10% of tempering water is sufficient for this purpose. After drying, the bodies are fired at the rate of 200° Fahrenheit per hour to at least 2450° Fahrenheit and maintained at this temperature for at least 4 hours. When cool, the bodies are cleaned and silver electrodes are applied to the opposite parallel faces in the usual manner, and the bodies are tested. The results indicated in the first portions of this specification are thus obtained; that is, dielectric constants of about 130 and power factors of less than 0.01%.

A suitable firing range for bodies described in the preceding paragraph is from 2450° to 2550° Fahrenheit. In many cases such relatively high firing temperatures are not convenient particularly where operations of other types requiring lower firing temperatures are also being carried on. It has been found that an excellent flux which has little or no effect on the electrical properties are the compounds of phosphorus which yield $P_2O_5$ of calcination. Suitable phosphorous compounds are the ammonium phosphates, aniline phosphates, and phosphoric acid of which the most convenient is the monoammonium diacid phosphate, a well crystallizable non-hygroscopic salt.

The flux addition may be made to the raw ingredients in which case the reacting ingredients are fired at 2250° Fahrenheit. However, it is more convenient from standpoint of control of firing temperatures to add the flux to the prefired and reacted calcium titanate. The amount of flux effective for reduction of the required firing temperature from 2450° to 2350° is about 1% of $NH_4H_2PO_4$ and for the lime-titania ratio given above no further lime addition is necessary for complete reaction. If the phosphate addition is increased, it is necessary to increase the ratio of lime to titania to take care of this increase in flux.

The following mixtures and procedures are examples of the principles of the present invention:

*Example I*

104 parts of precipitated whiting ($CaCO_3$) and 80 parts of titanium oxide of analysis A, above, are thoroughly mixed and calcined for 6 hours at 2300° Fahrenheit. The powder is milled wet in porcelain ball mills, using 70% water as a mill addition, until the slip will pass completely through a 325 mesh screen. The slip is dried and the dried powder comminuted. The dried powder is then mixed with 10 parts of water and pressed into plates. These are fired at temperatures increasing 200° Fahrenheit per hour up to 2450° Fahrenheit and the material is maintained at peak temperature for 4 hours. The cold bodies are then silver plated and their dielectric properties are measured.

At one megacycle the resulting material exhibits a dielectric constant of 129.0 and a power factor of $9 \times 10^{-5}$. The temperature coefficient of the power factor is zero throughout a temperature range from 20° C. to 150° C. At ten megacycles, the dielectric constant is 128.2 and the power factor is $7 \times 10^{-5}$, the temperature coefficient of the power factor remaining zero.

*Example II*

Example II is the same as Example I in all respects excepting the titania of analysis B was used. The same procedure was followed. At one megacycle, the dielectric constant is 133.0, the power factor $7.5 \times 10^{-5}$, and the temperature coefficient of the power factor, zero. At ten megacycles, the dielectric constant is 131.5; the power factor $5.5 \times 10^{-5}$, and the temperature coefficient of the power factor, zero.

*Example III*

Example III is the same as Example II excepting that one part of $NH_4H_2PO_4$ is mixed with each one hundred parts of the titanate after it has been calcined for reaction. Following the $NH_4H_2PO_4$ addition, the mixture is fired as in Examples I and II excepting that a peak temperature of only 2350° Fahrenheit is required to mature the dielectric body.

At one megacycle, the dielectric constant of the body of this example is 131.5; the power factor $8.5\times10^{-5}$, and the temperature coefficient of the power factor is zero. At ten megacycles, the dielectric constant is 130.2; the power factor $7\times10^{-5}$, and the temperature coefficient of the power factor, zero.

*Example IV*

106 parts of precipitated whiting are mixed with 80 parts of titania of analysis B, and 2.8 parts of $NH_4H_2PO_4$ and calcined for reaction for 6 hours at 2250° Fahrenheit. The reacted material is then prepared for firing as in Example I, and fired at temperatures increasing 200° Fahrenheit per hour until a temperature of 2350° Fahrenheit, which temperature is maintained for 4 hours.

At one megacycle, the dielectric body of Example IV has a dielectric constant of 129.7; a power factor of $9\times10^{-5}$, and a power factor temperature coefficient which is very slightly positive. At ten megacycles, the dielectric constant is 128.0; the power factor is $8\times10^{-5}$, and the power factor temperature coefficient is again very slightly positive.

What is claimed is:

1. The method of producing dielectric material which comprises mixing titanium dioxide and an oxide of calcium in such proportion as to form calcium titanate with an excess of calcium oxide, heating said mixture at calcining temperature to form calcium titanate, and subsequently firing said material containing such excess of calcium oxide to vitrification.

2. The method of producing dielectric material which comprises mixing titanium dioxide and calcium carbonate in such proportion as to form calcium titanate, there being an excess of calcium carbonate to react with impurities of the titanium dioxide, heating said mixture at calcining temperature to form calcium titanate and calcium compounds of the impurities, and subsequently firing said material containing such excess of calcium oxide to vitrification.

3. The method of producing dielectric material which comprises mixing titanium dioxide and an oxide of calcium in such proportion as to form calcium titanate with an excess of calcium oxide, and firing said material containing such excess of calcium oxide to vitrification.

4. The method of producing dielectric material which comprises mixing titanium dioxide and calcium carbonate in such proportion as to form calcium titanate with an excess of calcium oxide, and subsequently firing said material containing such excess of calcium oxide to vitrification.

5. The method of producing dielectric material which comprises mixing titanium dioxide and calcium carbonate in such proportion as to form calcium titanate with an excess of calcium oxide, and subsequently firing said material to vitrification in the presence of a flux yielding $P_2O_5$.

6. The method of producing dielectric material which comprises mixing titanium dioxide and calcium carbonate in proportions of from 80 parts by weight of titanium dioxide to between 102 and 120 parts by weight of calcium carbonate to form calcium titanate with an excess of calcium oxide, heating said mixture at calcining temperature to form calcium titanate, and subsequently firing said material containing such excess of calcium oxide to vitrification.

7. The method of producing dielectric material which comprises mixing titanium dioxide and calcium carbonate in proportions of from 80 parts by weight of titanium dioxide to between 102 and 120 parts by weight of calcium carbonate to form calcium titanate with an excess of calcium oxide, and subsequently firing said material containing such excess of calcium oxide to vitrification.

8. The method of producing dielectric material which comprises mixing titanium dioxide and calcium carbonate in proportions of from 80 parts by weight of titanium dioxide to between 102 and 120 parts by weight of calcium carbonate to form calcium titanate with an excess of calcium oxide, heating said mixture at calcining temperature to form calcium titanate, and subsequently firing said material to vitrification in the presence of a flux yielding $P_2O_5$.

9. The method of producing dielectric material which comprises mixing titanium dioxide and calcium carbonate in proportions of from 80 parts by weight of titanium dioxide to between 102 and 120 parts by weight of calcium carbonate to form calcium titanate with an excess of calcium oxide, and subsequently firing said material to vitrification in the presence of a flux yielding $P_2O_5$.

10. The method of producing dielectric material comprising mixing titanium dioxide and an oxide of calcium to form calcium titanate, there being sufficient of the oxide of calcium present to react with the impurities of the titanium dioxide, and heating said mixture containing such excess of calcium oxide for reaction and vitrification.

11. The method of producing dielectric material comprising mixing titanium dioxide and an oxide of calcium to form calcium titanate, there being sufficient of the oxide of calcium present to react with the impurities of the titanium dioxide, and heating said mixture for reaction and vitrification in the presence of a flux yielding $P_2O_5$.

12. The method of producing dielectric material comprising reacting a compound of titanium with a compound of calcium, said calcium compound being present in sufficient quantity to form calcium titanate and to react with the impurities present in the reaction, and subsequently firing the material containing such excess of calcium oxide to vitrification.

13. The method of producing dielectric material comprising reacting a compound of titanium with a compound of calcium, said calcium compound being present in sufficient quantity to form calcium titanate and to react with the impurities present in the reaction, and subsequently firing the material to vitrification in the presence of a flux yielding $P_2O_5$.

14. A dielectric composition of matter comprising vitrified, substantially pure calcium titanate, the usual impurities present being chemically combined with calcium oxide.

15. A dielectric composition of matter consisting of a vitrified mixture of substantially pure calcium titanate and a minor amount of impurities, the latter being in chemical combination with calcium.

16. The method of producing dielectric material which comprises mixing titanium dioxide and calcium carbonate in such proportion as to form calcium titanate, there being an excess of calcium carbonate to react with impurities of the titanium dioxide, heating said mixture at calcining temperature to form calcium titanate and calcium compounds of the impurities, and subsequently firing said material to vitrification in the presence of monoammonium diacid phosphate as a vitrifying flux.

EUGENE WAINER.